Sept. 16, 1924. 1,508,395
H. S. ISHAM
IMPLEMENT HANDLE AND INSERT THIMBLE
Filed Aug. 14, 1923 2 Sheets-Sheet 1
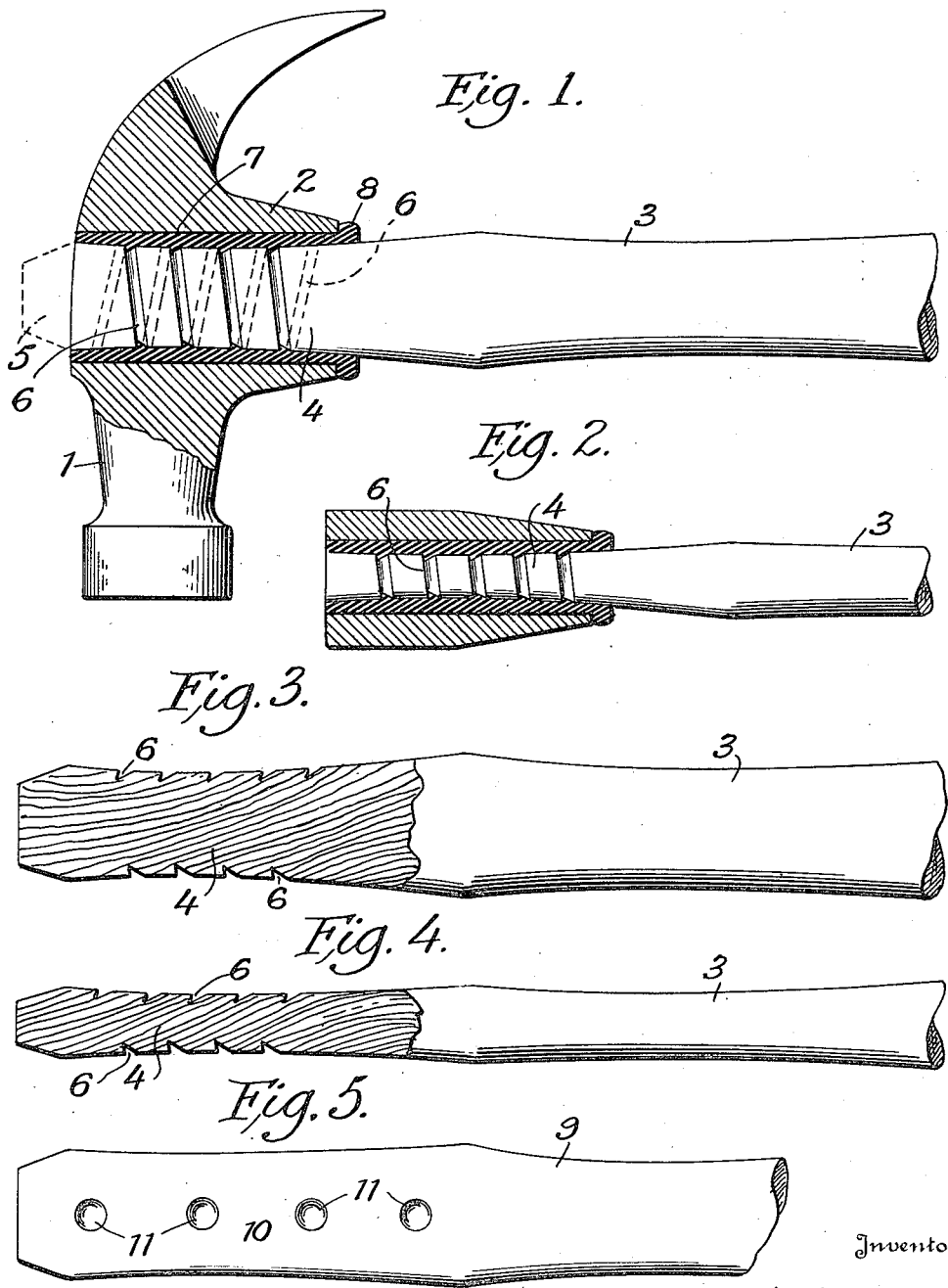
Inventor
Harry S. Isham,
By Edson Bros
Attorneys

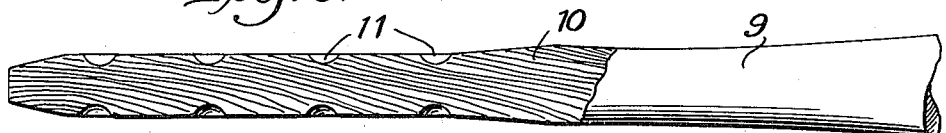
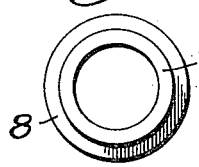 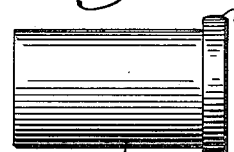 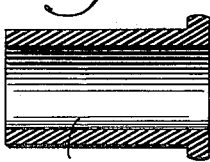 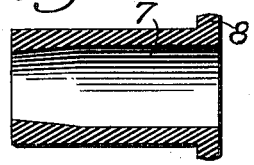
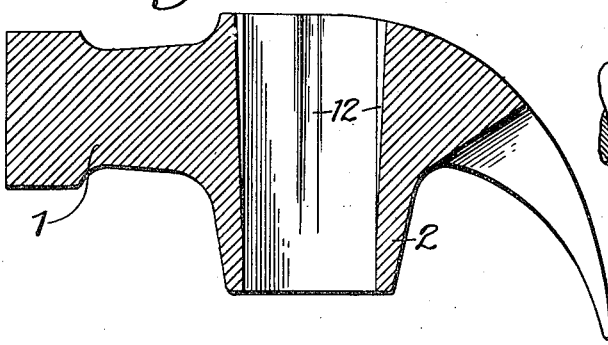 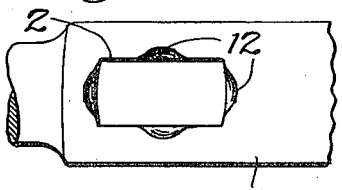
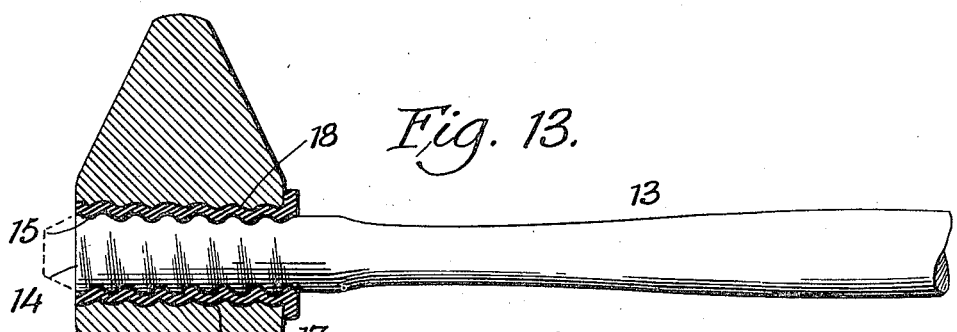
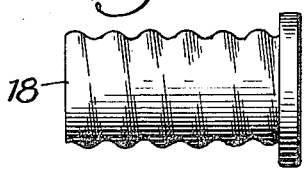
Inventor
Harry S. Isham, Patented Sept. 16, 1924.

1,508,395

UNITED STATES PATENT OFFICE.

HARRY S. ISHAM, OF BELMAR, NEW JERSEY, ASSIGNOR, BY DIRECT AND MESNE ASSIGNMENTS, TO HELLER BROTHERS COMPANY, OF NEWARK, NEW JERSEY, A CORPORATION OF NEW JERSEY.

IMPLEMENT HANDLE AND INSERT THIMBLE.

Application filed August 14, 1923. Serial No. 657,404.

*To all whom it may concern:*

Be it known that I, HARRY S. ISHAM, citizen of the United States, residing at Belmar, in the county of Monmouth and State of New Jersey, have invented certain new and useful Improvements in Implement Handles and Insert Thimbles, of which the following is a specification, The present invention relates to an improved construction and arrangement of the eyes of implements, their handles and elastic cushion inserts, such as rubber for securing the handle in the eye.

The present invention relates more particularly to improvements in the subject matter of my Patent No. 1,435,851, November 14, 1922.

The principal object of the present invention is to provide an improved means for securing the elastic cushion or rubber insert in the eye of the implement and for securing the handle within the elastic cushion or rubber insert.

A further object is to provide a particularly effective surface either in the eye of the implement or on that portion of the handle which is inserted in the implement or on the inner or outer surface of the rubber insert or on any one or two or three of these.

Other objects and advantages of the present invention will appear as the following description proceeds, taken in connection with the accompanying drawings which illustrate several preferred forms of the invention and in which—

Figure 1 is a side view partly in section of a hammer embodying the present invention.

Figure 2 is a sectional view through the handle insert and tool head shown in Fig. 1.

Fig. 3 is a side elevation partly in section of the handle shown in Figs. 1 and 2.

Fig. 4 is a top plan view partly in section of said handle.

Fig. 5 is a side elevation of an implement embodying the present invention.

Fig. 6 is a plan view partly in section of the implement handle shown in Fig. 5.

Figs. 7 and 8 are respectively an end and side elevation of the elastic cushion or rubber insert which is placed between the implement head and that portion of the implement handle which is inserted in said head, embodying the present invention.

Fig. 9 is a sectional view of the insert shown in Fig. 8.

Fig. 10 is a sectional view of a modified form of insert.

Fig. 11 is a sectional view of an implement head shown by way of example in this figure as a hammer and having a specially formed surface within its eye embodying the present invention.

Fig. 12 is an end elevation of the hammer shown in Fig. 11.

Fig. 13 is a side elevation of an implement, handle, and insert formed and assembled in accordance with the present invention, the implement head and insert being shown in sections.

Fig. 14 is a view in side elevation of the insert shown in Fig. 13.

Several of the figures of the accompanying drawings illustrate the implement head as being that of a hammer, but it is to be understood that a hammer is shown herein for purposes of illustration merely and that the present invention is applicable to other implements such as hatchets, sledges, axes, mauls, stone cutters' mallets, chisels, punches, smith forge tools, picks, cutting tools, miners' tools and other implements, especially of the type in which a handle is inserted in an eye formed in the implement head.

Referring in detail to the accompanying drawings and especially to Figs. 1 to 4 inclusive, the reference numeral 1 represents an implement head herein illustrated by way of example as being the head of a hammer. The hammer head 1 is provided with an eye 2 having a greater height than width, as shown in Fig. 1. In the example of the invention illustrated in these figures the eye 2 is formed as a smooth and regular oval of rectangular bore, preferably centrally contracted. The handle 3 is provided with an end 4 designed to be inserted in the eye of the implement and is concaved on all its lateral faces or surfaces, as seen in Figs. 1 and 3, and as seen in plan view in Figs. 2 and 4.

The end portion 4 is provided with a tapered portion 5 at its outermost end for the purpose of facilitating the insertion of the end 4 into the eye of the implement, as hereinafter more fully explained. After the assembly of the handle, insert and implement head, the tapered end 5 may be removed to leave a smooth end for the implement.

Formed about the end 4 is a groove 6 shown here as being spirally formed about the end 4. It will be observed that this groove 6 when seen in section as in Figs. 3 and 4, is preferably slightly undercut toward the end of the handle to be inserted in the eye of the implement.

Inserted in the eye 2 of the implement head 1 is an elastic cushion 7 preferably in the form of a rubber insert having a flange 8 at one end and a smooth inner wall convex in cross section, the largest inside diameter of said insert 7 being near the ends thereof.

In assembling the parts, the insert 7 may be dipped into a lubricant composed of a solution of rubber and may then be placed in the eye 2 of the implement, after which the end 4 of the handle 3 may be inserted within the insert, this operation being facilitated by the tapered end 5. After the device has been assembled the tapered end 5 may be removed. Or as well the insert may be placed over the end 4 and the end 4 carrying the insert 7 be dipped into the rubber solution and the whole inserted into the eye 2 of the implement. The solution of rubber is fugitive and soon evaporates leaving the rubber in solid form, in which condition it acts as a cement. In either case the flange 8 on the insert 7 abuts against the implement head and accurately defines the position which the insert takes with respect to the said head.

It will be seen that the thickness of the wall of the insert 7 is greater at or near its middle and least at or near its ends. Owing to the deformable nature of the rubber insert it may originally be formed of general cylindrical external contour, as it will conform to the shape of the end 4 of the handle when it is placed thereover. Furthermore, owing to the elasticity, resiliency and deformability of the rubber insert, the portions thereof lying adjacent the undercut groove 6 will extend into said groove. It will be observed that the groove 6 is undercut in the proper direction to prevent pulling the handle 3 out of the insert 7.

The elastic cushion or rubber insert 7 acts to absorb shocks and prevent their transmission along the handle to the hand of the user of the implement.

Referring now to Figs. 5 and 6, the handle 9 is provided with the end 10 having depressions 11 formed in its side walls and shown herein as being spherically concave. The top and bottom of the end 10 are shown as being longitudinally concave as shown in Fig. 5 and the side walls, as seen in plan view in Fig. 6, are shown as being straight. The elastic cushion or rubber insert is used as before and portions thereof will project into the depressions 11 and thereby act to prevent the withdrawal of the handle from the insert.

The elastic cushions or rubber inserts 7 may be conveniently formed of general cylindrical outline, as illustrated in Figs. 7 to 10, as owing to their deformable nature they will conform to the shape of the end of the handle or as shown in Fig. 10, the wall of the insert may be slightly thickened toward one of its ends to provide for a greater quantity of rubber at the outer end of the handle between it and the inner wall of the tool head filling in the spherically concaved depressions or longitudinal grooves and preventing the withdrawal of the handle from the insert and preventing the implement head from coming off the handle.

Referring to Figs. 11 and 12, the tool head 1 may be provided with an eye 2 having formed therein a number of grooves 12 herein illustrated as being four in number, though it is apparent that any desired number, either more or less than four may be used within the spirit and scope of the invention. These grooves 12 are tapered in form, that is to say, they are deeper at the outer end of the implement head and gradually decrease in depth as they approach the other end of the implement head and may terminate, as shown, before reaching that end. They may be concaved or square, but are preferably concaved. The outer surface of the elastic cushion or rubber insert will project into the grooves 12 and owing to the wedge shaped form of these grooves the projecting portions of the elastic cushion or rubber insert will also take a wedge shape form and this wedge-shaped formation will act to prevent the withdrawal of the elastic cushion or rubber insert from the eye of the implement handle. It will be readily apparent that this or a similar construction of the eye of the tool head may be used in conjunction with and in addition to specially formed ends of the handle such as for example are illustrated in Figs. 1 to 6, inclusive.

Referring to Figs. 13 and 14, the handle 13 is shown as being provided with an end 14 having formed around its outer surface a rounded groove 15, of the screw type, the sides of which are shown as being symmetrical. The end is shown as being semi-spherical or convexed to facilitate inserting it in the eye of the implement. The implement head 16 is shown as being provided with a similarly grooved eye 17 and the elastic cushion or rubber insert 18 is shown as being similarly formed on its outer and, if desired, its inner surface; and the implement head, handle and insert may be conveniently assembled by screwing the end 14 of the handle into the insert and by then screwing the handle and insert into the eye 17 of the implement head, preferably, however, by inserting the rubber thimble in place in the eye of the tool, then inserting the implement handle. The rubber thimble may be preferably tapered as shown in Fig. 10. The handle, Fig. 13, may be tapered at its end; or, in the case of tools similar to picks, specially tapered inward from the end.

It will be observed that the space between the implement head and the handle end will be filled with a body of material under a high degree of compression, although its elastic properties will not be materially diminished. Furthermore the high frictional properties of rubber are available for preventing slipping of the insert in the implement head or the handle in the insert.

It will also be observed that by the above described constructions I have provided not only an implement and handle assembly which will absorb the shocks of blows and prevent their transmission along the handle to the hand of the user of the implement but there has also been provided a construction which permits of the easy and rapid assembly of the parts and yet a construction which, when once the parts are assembled, will by the formation of one or more of those parts before assembly and by the formation of the elastic cushion or rubber insert either before or after assembly, act to prevent the handle from accidental or easy withdrawal from the elastic cushion or rubber insert and also the accidental or easy displacement of the elastic cushion or rubber insert from the implement head.

It will be apparent that the parts of the present invention may be assembled, if desired, either with or without the use of the rubber solution above referred to and the frictional properties of the rubber, its compressed condition and its surface deformed in accordance with the shape of the handle end or the shape of the surface of the implement eye may be relied upon alone for maintaining the parts in assembled position.

What is claimed is:

1. The combination of an implement head member provided with an eye, and a handle member having an end smaller than said eye and inserted therein, of an elastic cushion between said handle end member and said implement head member, said handle member having undercut grooves about its surface, portions of said elastic cushion extending into said undercut grooves.

2. The combination of an implement head member provided with an eye and a handle member having an end smaller than said eye, and inserted therein, of an elastic member between said handle end member and said implement head member, said handle member having spiral grooves about its surface, the elastic member being adapted to be distorted so as to conform to the shape of the handle, portions of said elastic member being adapted to enter the spiral grooves.

3. The combination of an implement head member provided with an eye and a handle member inserted therein, of an elastic member between said handle end member and said implement head member, said handle member having spiral undercut grooves about its surface, the elastic member being adapted to be distorted upon assembly so as to conform to the shape of the handle member and enter the undercut grooves.

In testimony whereof I affix my signature.

HARRY S. ISHAM.